J. W. HENRY.
Hay Raker and Loader.
No. 69,432.
Patented Oct. 1, 1867.
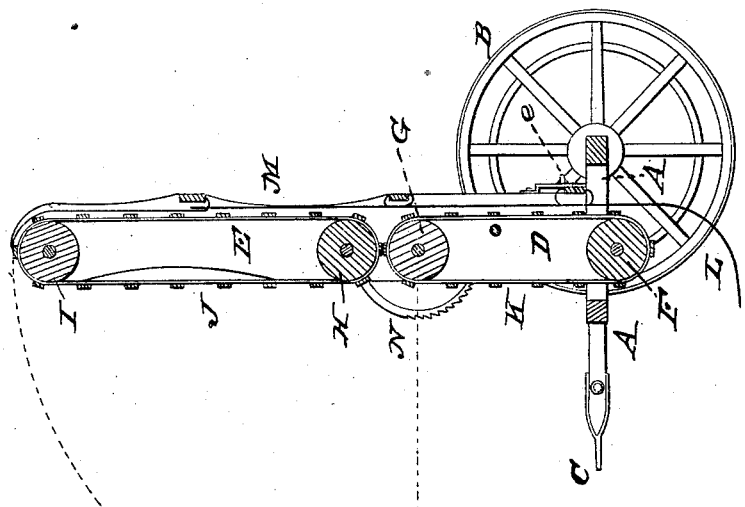
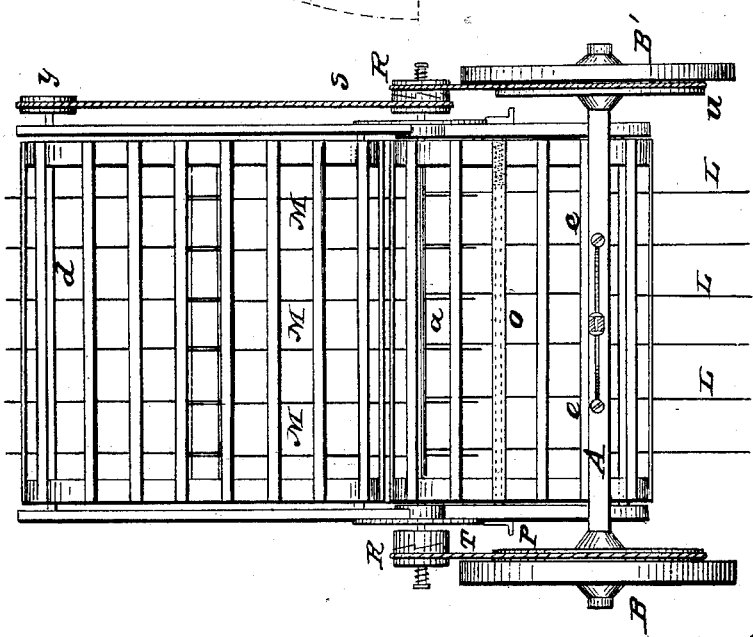

United States Patent Office.

JAMES W. HENRY, OF PECATONICA, ILLINOIS.

Letters Patent No. 69,432, dated October 1, 1867.

---

IMPROVEMENT IN HAY-RAKERS AND LOADERS.

---

The Schedule referred to in these Letters Patent and making part of the same.

---

TO ALL WHOM IT MAY CONCERN:

Be it known that I, JAMES W. HENRY, of Pecatonica, in the county of Winnebago, and in the State of Illinois, have invented certain new and useful improvements in Combined Hay-Rake and Elevator; and do hereby declare that the following is a full, clear, and exact description thereof, reference being had to the accompanying drawings and to the letters of reference marked thereon.

In the annexed drawings, making part of this specification, A A represent a rectangular wooden frame, which is provided at its rear side with an axle, which said axle is supported by means of the wheels B B'. Erected upon the frame A are two uprights D D, one at each side, and above the uprights D are two uprights E E, which are hinged at their lower ends to the uprights D, for the purpose hereinafter described.

Crossing near the ends of the two sets of uprights are shafts, which are provided near their ends with drums. G and F represent the drums of the shafts of the lower uprights, and I and H represent those of the upper. Around the drums of these shafts pass the aprons K and J; said aprons consisting of belts which pass over the drums, being connected together by slats secured to them at a suitable distance apart. L L represent rake-teeth, which are secured at their upper ends to an adjustable bar, $e$, which said bar is secured across the back sides of the uprights D D. These teeth project below the frame, and gather the hay from the ground. M M represent a series of wire rods, which pass up from the rake, and at the back of the endless aprons, to the upper ends of the uprights E, and curve over the apron at that point. The shaft $a$ at the upper ends of the uprights D, is provided at its outer ends with the clutch-pulleys R R. U and T represent bands, which pass around drums formed upon the inner faces of the wheels B B', and then around clutch-pulleys on shaft $a$. S represents a band which passes from a clutch-pulley or shaft, $a$, to a pulley, $y$, on the shaft $d$, at the upper end of the uprights E E. When the wheels B B' revolve, the endless aprons J and K are set in motion by the bands T, U, and S. The hay is collected by the teeth L L, and is carried up by the endless aprons between it and the rods M M, and is discharged at the termination of the rods M. Secured to the uprights E E are two curved bars or plates, which are provided on their outer edges with ratchet-teeth, and these teeth are caught into by two pawls P P on a shaft O. By means of the plates N N and the pawls P P, the upper ends of the uprights E with their apron may be set forward and stationed at any point upon curve X, seen in red line, fig. 2.

The object in throwing the upper end of the upper apron forward is this: This machine is intended to be secured in rear of a wagon, and as the wagon proceeds through the field, and hay is collected and carried up between the endless aprons and the rods M, and discharged at the termination of the rods, it is most convenient to have the upper apron pass forward over the wagon, so that when it discharges its hay it will fall upon the wagon. The clutch-pulleys enable the motion of the aprons to be kept up while the machine is turning.

Having thus fully described my invention, what I claim as new, and desire to secure by Letters Patent, is—

The upper and lower frames, composed of the uprights E E and D D, with their endless aprons, and shafts, and drums, arranged with the rake L and rods M M in such a manner that hay is carried up and emptied forward of the machine, as and for the purpose set forth.

In testimony that I claim the foregoing I have hereunto set my hand this 21st day of May, 1867.

JAMES W. HENRY.

Witnesses:
HENRY M. TRIPP,
GEORGE W. KEYES.